United States Patent
Sherlock

(10) Patent No.: US 11,542,682 B2
(45) Date of Patent: Jan. 3, 2023

(54) COUNTERWEIGHT REMOVAL PROTECTION SYSTEM

(71) Applicant: DEERE & COMPANY, Moline, IL (US)

(72) Inventor: Lance R. Sherlock, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 375 days.

(21) Appl. No.: 16/847,873

(22) Filed: Apr. 14, 2020

(65) Prior Publication Data

US 2021/0317633 A1 Oct. 14, 2021

(51) Int. Cl.
*E02F 9/20* (2006.01)
*E02F 9/18* (2006.01)
*E02F 9/24* (2006.01)
*H04N 7/18* (2006.01)
*E02F 3/32* (2006.01)
*E02F 9/08* (2006.01)
*E02F 9/26* (2006.01)

(52) U.S. Cl.
CPC .............. *E02F 9/2095* (2013.01); *E02F 9/18* (2013.01); *E02F 9/24* (2013.01); *H04N 7/183* (2013.01); *E02F 3/32* (2013.01)

(58) Field of Classification Search
None
See application file for complete search history.

(56) References Cited

U.S. PATENT DOCUMENTS

| 3,375,021 | A | 3/1968 | Grider |
| 3,533,524 | A | 10/1970 | Wilcox |
| 3,891,095 | A | 6/1975 | Symmank |
| 8,434,787 | B2 | 5/2013 | Halepatali et al. |
| 2017/0210432 | A1* | 7/2017 | Cartechini ........... B62D 49/085 |
| 2019/0236370 | A1* | 8/2019 | Man ................. G05B 19/41875 |

FOREIGN PATENT DOCUMENTS

JP 2018105064 A * 7/2018

* cited by examiner

*Primary Examiner* — Christopher Braniff
(74) *Attorney, Agent, or Firm* — Taft Stettinius & Hollister LLP; Stephen F. Rost

(57) ABSTRACT

A counterweight removal protection system and a method of controlling removal of the counterweight to avoid damage to an imaging sensor system of a work vehicle, such as an excavator. The imaging sensor system includes an imaging sensor supported by the counterweight and configured to transmit an imaging sensor signal to a vehicle controller to determine the state of the imaging sensor signal. A user interface in the work vehicle includes a selectable touch button to enable removal of the counterweight depending on the state of the imaging sensor signal. An interlock device prevents lowering the counterweight based on the state of the imaging sensor signal. In one embodiment, the imaging sensor signal is a heartbeat signal.

20 Claims, 3 Drawing Sheets

COUNTERWEIGHT REMOVAL PROTECTION SYSTEM

FIELD OF THE DISCLOSURE

The present disclosure relates to a work vehicle for moving large objects or for excavating, and more particularly, to an excavator having a counterweight.

BACKGROUND

Work vehicles, such as an excavator, can be used in construction and maintenance for excavating soil and composite materials, such as aggregates, and moving large objects. When building a building, for instance, the excavator is used for digging excavations as well as for trenching purposes. The excavator typically includes two or more axles that drive tracks with an engine. A counterweight is disposed above a rear portion of the tracks and a cab is disposed above a central portion of the tracks. A boom has a proximal end located near the cab and a boom arm is connected at a distal end of the boom. A bucket is typically connected to an end of the arm and is configured to carry the large and heavy loads excavated or lifted by the boom and boom arm. Other implements attached to the arm include power clamps and backhoe buckets.

The boom and the boom arm extend from the cab, wherein weight of the combined extension of the boom and boom arm can exceed weight of the work vehicle located behind the boom. Because the loads carried by the attached implement can be extremely heavy, the counterweight located at the rear of the vehicle includes a mass sufficiently large to counterbalance the work operations being performed by the excavator.

The counterweight is detachably connected to the excavator and can be removed from the excavator as needed. For instance, the counterweight is often removed when the excavator is being transported by a trailer when being moved from one location to another location. In one or more different excavators, the counterweight is raised to and lowered from the machine by one or more actuator. In some embodiments, sensing systems are supported by the counterweight.

It would be desirable to monitor the position of the counterweight to insure that attachment and removal of the counterweight does not impact the status or condition of the supported sensing systems.

SUMMARY

In one embodiment, there is provided a method to control the position of a counterweight with a lever operated actuator of a work vehicle to reduce damage to an imaging sensor system having a controller, a user interface operatively connected to the controller, and an imaging sensor operatively connected to the controller and supported by the counterweight. The method includes: transmitting a signal from the imaging sensor; receiving the transmitted signal at the controller; transmitting an imaging sensor status signal from the controller to the user interface based on the received transmitted signal, the imaging sensor status signal indicating a connection status of the imaging sensor with the controller; providing a lever interlock button at the user interface; and enabling, in response to actuation of the lever interlock button, a lowering of the counterweight based on the connection status of the imaging status sensor signal.

In another embodiment, there is provided a counterweight removal protection system for a work vehicle having a counterweight, a lever operated actuator to lower the counterweight from a portion of the work vehicle, and an imaging sensor supported by the counterweight and configured to transmit an imaging sensor signal. The system includes a user interface, an interlock device, and a controller operatively connected to the imaging sensor. The controller is configured to receive the imaging sensor signal and includes a processor and a memory, wherein the memory is configured to store program instructions. The processor is configured to execute the stored program instructions to: transmit an imaging sensor status signal from the controller to the user interface based on the received imaging sensor signal, the imaging sensor status signal indicating a connection status of the imaging sensor with the controller; provide a lever interlock button at the user interface; and enable, in response to actuation of the lever interlock button, a lowering of the counterweight based on the connection status of the imaging status sensor signal.

In still another embodiment, there is provided an excavator including a counterweight, an actuator, a lever operatively connected to the actuator to lower the counterweight from a portion of the excavator, an imaging sensor supported by the counterweight and configured to transmit an imaging sensor signal, a user interface, and an interlock device. A controller is operatively connected to the imaging sensor and is configured to receive the imaging sensor signal. The controller includes a processer and a memory, wherein the memory is configured to store program instructions. The processor is configured to execute the stored program instructions to: transmit an imaging sensor status signal from the controller to the user interface based on the received imaging sensor signal, the imaging sensor status signal indicating a connection status of the imaging sensor with the controller; provide a lever interlock button at the user interface; and enable, in response to actuation of the lever interlock button, a lowering of the counterweight based on the connection status of the imaging status sensor signal.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. For instance, while excavators are described, the present disclosure is not limited to excavators, and includes other types of work vehicles including forestry equipment such as feller bunchers and harvesters.

Figure 1:
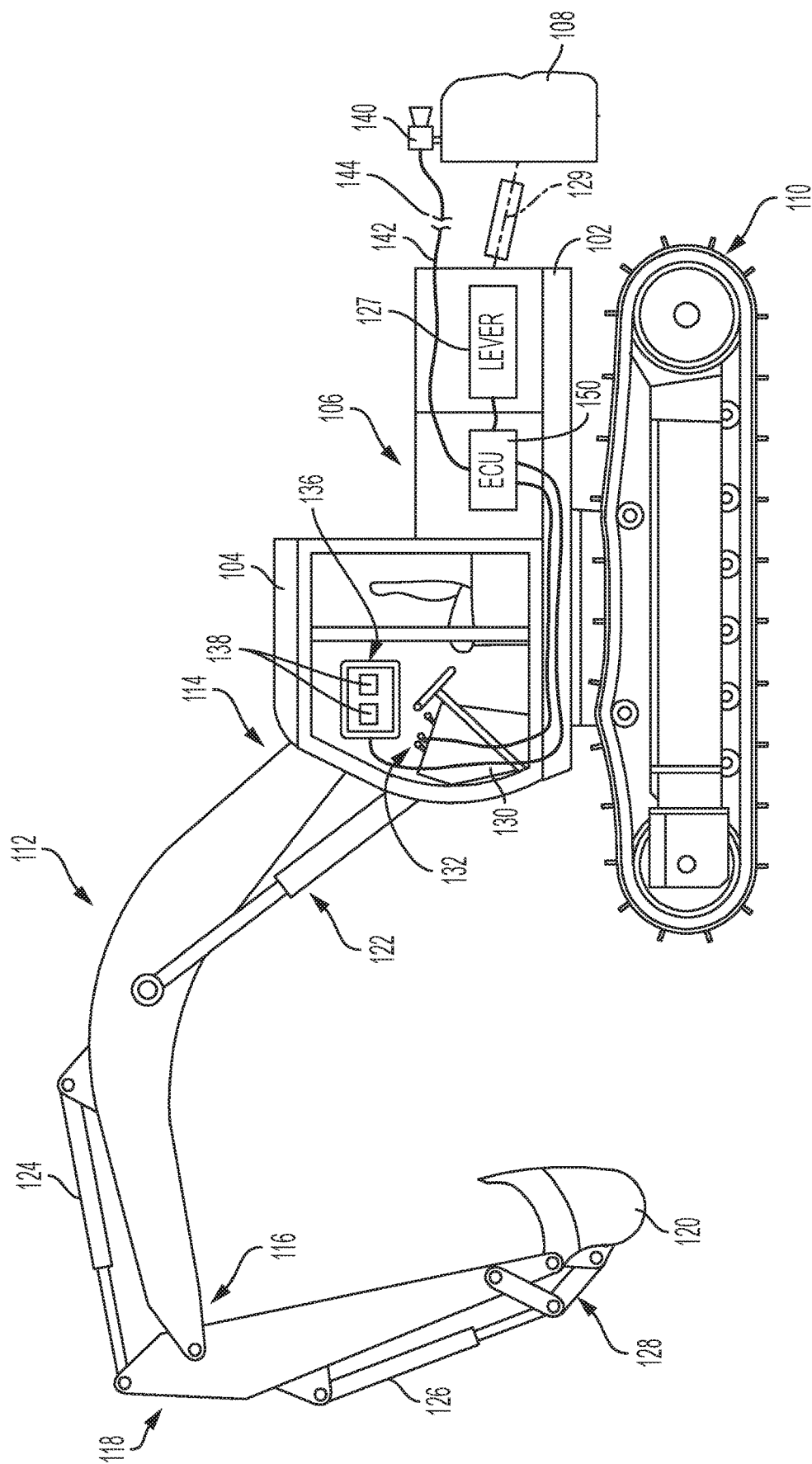
FIG. 1 is an elevational side view of a work vehicle, such as an excavator.

Referring to FIG. 1, an exemplary embodiment of an excavator 100 is illustrated. The excavator 100 includes a frame 102, an operator cab 104, an engine compartment 106, and a counterweight 108. The frame 102 is supported by traction devices 110 for moving the excavator over, for instance, rough terrain often encountered in excavation projects. A boom 112 includes a proximal end 114 generally rotatably coupled near the cab 102 and a distal end 116 to which an arm 118 is rotatably coupled. A bucket 120 is operatively connected to the arm 120 to perform excavation and other work operations. A boom actuator 122 has a proximal end coupled to the frame 102 and a distal end coupled to the boom 112. The boom actuator 122 is be used to raise and lower the boom 112. An arm actuator 124 has a proximal end coupled to boom 112 and a distal end coupled to the arm 124. The arm actuator 124 is used to raise and lower the arm 118. A bucket actuator 126 has a proximal end coupled to the arm 118 and a distal end coupled to bucket linkage 128 that is coupled to the bucket 120. The bucket actuator 126 and bucket linkage 128 are used to adjust the position of the bucket 120. In one or more embodiments, the boom actuator 122, the arm actuator124, and the bucket actuator 126 are hydraulic cylinders responsive to position commands provided by an operator located in the cab 104 as understood by one skilled in the art.

Because the loads carried by the attached implement 120 can vary, the counterweight 108 located at the rear of the vehicle is detachably connected to the vehicle 100 and can be removed from the excavator as needed. A counterweight lever 127 is located behind a service door toward the rear of the vehicle 100. To remove the counterweight 108, the counterweight lever 127 is moved by the operator to a first position, the lower position, to lower the counterweight 108 to the ground for removal. As used herein, the "lower position" of the lever 127 is the position of the lever 127 that enables the counterweight 108 to be lowered. In the first position, an actuator 129 moves the counterweight 108 to the ground. To reattach the counterweight 108 to the vehicle 100, the counterweight 108 is connected to the actuator 129. The operator moves the counterweight lever 127 to a second position, the raise position, to raise the counterweight 108 for attachment to the vehicle 100. As used herein, the "raise position" of the lever 127 is the position of the lever 127 that enables the counterweight 108 to be raised.

The operator cab 104 is mounted and supported by the frame 102. An operator is positioned at a workstation 130 to access control devices to operate the excavator 100, the boom 112, and the bucket 120. The workstation 130 includes one or more operator controls including one or more toggles 132 and a steering wheel 134. Located at the workstation 130 or adjacent thereto is a display device 136. The display device 136 displays a user interface and includes one or more different types of operator controls 138 including manual and electronic buttons or switches. In different embodiments, the user interface includes a visual display providing operator selectable menus for controlling various features of the vehicle 100. In one embodiment, the user interface includes a plurality of user selectable touch buttons, also known as soft buttons, to select from a plurality of commands or menus, each of which is selectable through a touch screen of the display device 136. Touch buttons respond to touch and do not include a mechanical component requiring a force sufficient to engage mechanical features. The touch screen is a graphical user interface configured to display icons, content of work machine applications, and status of devices. The display device 136, includes but is not limited to cathode ray tube (CRT) displays, light-emitting diode (LED) displays, and liquid crystal displays (LCD).

In one or more embodiments, a video display is provided at the display device 136 to show images provided by an imaging sensor 140 located at the counterweight 108. The imaging sensor 140 is rear facing and provides one or more electrical signals to a controller or ECU (electronic control unit) 150 located on the vehicle 100 through an electrical cable 142 having a connector 144 to connect and to disconnect the imaging sensor 140 from the controller 150. The imaging sensor 140, in different embodiments, includes an ultrasonic device, a radar device, or a video camera, each of which is configured to provide image signals to the ECU 150 indicative of the terrain and any obstacles located behind or at the sides of the vehicle 100. Other embodiments of the imaging sensor 140, include but are not limited to, a two dimensional camera, a three dimensional camera, a stereo camera, a monocular camera, a laser scanning device, and a light detection and ranging (LIDAR) scanner. The imaging sensor 140, the cable 142, the connector 144, the controller 150, and other related support structures comprise an imaging sensor system of the present disclosure.

The ECU 150, in different embodiments, is located at different locations within the vehicle 100 including the frame 102, within the engine compartment 106, or at the workstation 130. Other locations are contemplated. In one or more embodiments, the ECU 150 is a distributed controller having separate individual controllers distributed at different locations on the vehicle. In addition, while the controller is generally hardwired by electrical wiring or cabling to sensors and other related components, in other embodiments the controller includes a wireless transmitter and/or receiver to communicate with a controlled or sensing component or device which either provides information to the controller or transmits controller information to controlled devices. In one embodiment, the ECU 150 is connected to a controller area network (CAN) bus (not shown). The CAN bus is configured to transmit electrical control signals for the control of various devices connected to the bus as well as to transmit status signals that identify the status of the connected devices.

Figure 2:
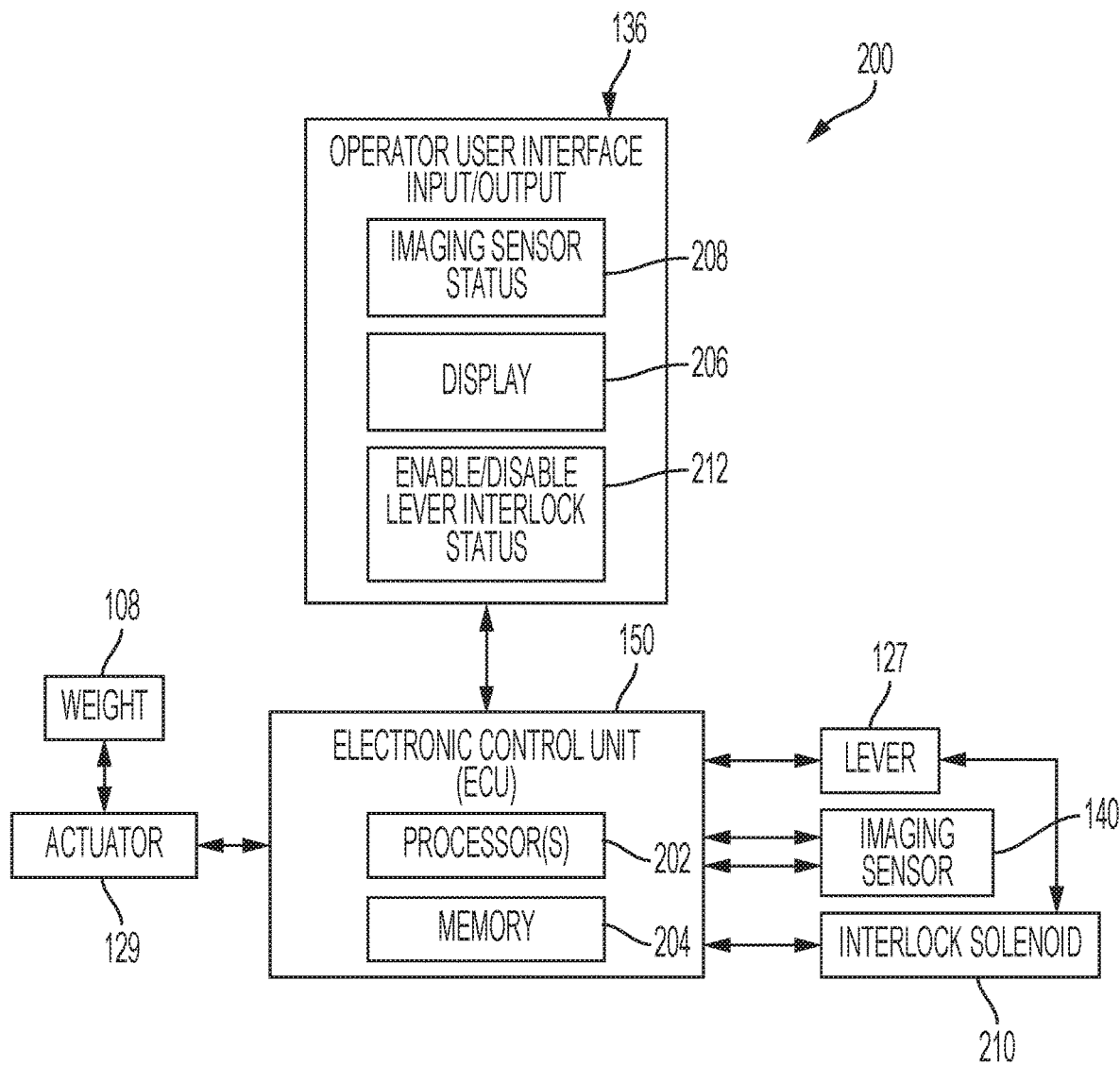
FIG. 2 is a simplified schematic diagram of an excavator control system.

FIG. 2 illustrates a block diagram of a control system 200 that includes control circuitry including the controller 150 which is operatively connected to the display device 136, the actuator 129, and the imaging sensor 140. In different embodiments, the actuator 129 includes one or more hydraulic cylinders. Other types of actuators are contemplated.

The controller 150, in different embodiments, includes a control module, a computer, computer system, or other programmable devices. In other embodiments, the controller 150 includes one or more processing devices 202 (e.g. processors), having operating logic and an associated memory 204, which is internal to the processor or external to the processor. The memory 204 includes, in different embodiments, random access memory (RAM) devices comprising the memory storage of the controller 150, as well as any other types of memory, e.g., cache memories, non-volatile or backup memories, programmable memories, or flash memories, and read-only memories. In addition, the memory includes in other embodiments a memory storage physically located elsewhere from the processing devices and can include any cache memory in a processing device, as well as any storage capacity used as a virtual memory, e.g., as stored on a mass storage device or another computer coupled to the controller 150. The mass storage device can include a cache or other dataspace which can include databases.

Memory storage, in other embodiments, is located in the "cloud", where the memory is located at a distant location which provides the stored information wirelessly to the controller 150. When referring to the controller 150 and the memory 204 in this disclosure, other types of controllers and other types of memory are contemplated. In one or more embodiments of the controller 150, a second memory is connected to the processing device 202 to store, for instance, one or more applications, operating system software, and graphical user interface software to provide for the display of information on the display device 136, as well as to provide the touch screen access to the various applications through a touch screen graphical user interface.

The memory 204, in different embodiments, includes one or more types of non-transitory computer-readable media, such as a solid-state memory, electromagnetic memory, optical memory, or a combination thereof. Furthermore, the memory may be volatile and/or nonvolatile and, in some embodiments, some or all of the memory may be of a portable type, such as a disk, tape, memory stick, cartridge, and/or other suitable portable memory. In operation, the memory may store various data and software used during operation of the computing device such as operating systems, applications, programs, libraries, and drivers. It should be appreciated that the memory may store data that is manipulated by the operating logic of processing device 202, such as, for example, data representative of signals received from and/or sent to the imaging sensor 140 in addition to or in lieu of storing programming instructions defining operating logic.

The controller 150 executes or otherwise relies upon computer software applications, components, programs, objects, modules, or data structures, etc. Software routines resident in the included memory 202 of the controller 150, or other memory, are executed in response to the signals received from the imaging sensor 140 as well as signals received from other controllers or ECUs such as an engine ECU and a transmission ECU. The controller 150, in one or more embodiments, also relies on one or more computer software applications that are located in the "cloud", where the cloud generally refers to a network having stored data and/or computer software programs accessed through the internet.

The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user.

Moreover, while the invention is described in the context of controllers, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, flash drives, optical disks (e.g., CD-ROM's, DVD's, etc.), among others, and transmission type media such as digital and analog communication links.

It should be appreciated that the process or processes described herein are implementable in various program code and should not be limited to specific types of program code or specific organizations of such program code. Additionally, in view of the typically endless number of manners in which computer programs may be organized into routines, procedures, methods, modules, objects, and the like, as well as the various manners in which program functionality may be allocated among various software layers that are resident within a controller or computer if used, (e.g., operating systems, libraries, APIs, applications, applets, etc.), it should be appreciated that the invention is not limited to a specific organization.

The imaging sensor 140, in different embodiments, transmits one or more signals that are received by the controller 150. In one embodiment, the imaging sensor 140 transmits an image signal and a "heartbeat" signal to the controller 150. The image signal being transmitted depends on the type of imaging sensor being used. The image signal, in one embodiment is conditioned by the controller 150 and is transmitted to a display 206 of display device 136. In one embodiment, the heartbeat signal is a signal generated by the imaging sensor 140 which is used to indicated normal operation of the sensor 140, or for activation and/or synchronization purposes. In one embodiment, the heartbeat signal is a periodic signal generated by imaging sensor 140. In another embodiment, the heartbeat signal is generated by controller 140 and/or software to indicate the controller 150 is receiving the imaging signal. The status of the heartbeat signal is displayed at the imaging sensor status icon 208 at the display device 136. In a first state of the icon 208, the icon 208 indicates the receipt of the heartbeat signal indicating that the imaging sensor is operational and transmitting the imaging signal to the controller 150. In a second state of the icon 208, the icon 208 indicates that there is no receipt of the heartbeat signal indicating that the imaging sensor is not operational or that the imaging sensor 140 is not electrically connected to the controller 150.

Because the imaging sensor NO is supported by the counterweight, which is removable, the imaging sensor 140 must be disconnected from the controller 150 before the counterweight is removed. By separating the connector 144 such that the imaging sensor 140 no longer is electrically connected to the controller 150, damage to the imaging sensor can be avoided.

In some cases, the operator when lowering the counterweight 108 can forget to disconnect the imaging sensor 140 from the controller 150 by failing to separate the mating parts of the connector 144. When this occurs, lowering of the counterweight 108 can damage the connection between the imaging sensor 140 and the controller 150 at a location other than the connector 144. In one or more situations, the cable 142 may be damaged, the sensor 140 may be damaged, or another structure holding the cable in place may be damaged. To alleviate damage and to protect the cable 142, the controller 150 is configured to determine the status of the connection between the imaging device 140 and the controller 150. Upon determining the status of the connection, for instance by using the heartbeat signal, an interlock device is provided to prevent lowering of the counterweight, if the heartbeat signal is present. If the heartbeat signal is present, the operator is alerted to disconnect the connection between the imaging sensor 140 and the controller 150 before the counterweight 108 is lowered.

In one embodiment, the interlock device is an interlock solenoid 210 operatively connected to the controller 150 and which includes a first state, the "block state", that prevents or blocks the lever 127 from being moved to the lower or to the raise position, and a second state, the "unblock state", that enables or unblocks the lever 127 for being moved to the lower position or to the raise position. To lower the counterweight 108, the interlock solenoid 210 is actuated to the second state, if the heartbeat signal is not present, to indicate that the imaging device 140 is disconnected from the controller 150. If however, the heartbeat signal is present, the interlock solenoid is located at the first state and the lever 127 cannot be moved to lower the counterweight.

In one embodiment, the interlock solenoid 127 includes or is connected to a blocking mechanism that prevents the lever 127 from being moved. In one embodiment, the blocking mechanism is a mechanical block that physically prevents the lever from being moved. In another embodiment, the blocking mechanism is an electrical block that electrically prevents the lever 127 from being moved.

The controller 150, including the processor 202 and memory 204, is configured to determine the status of the heartbeat signal and to respond to the operator's request to lower the counterweight 108. The memory 204 is configured to store program instructions and the processor 202 is configured to execute the stored program instructions to respond to the operator's request as illustrated in a process diagram 218 of FIG. 3.

Figure 3:
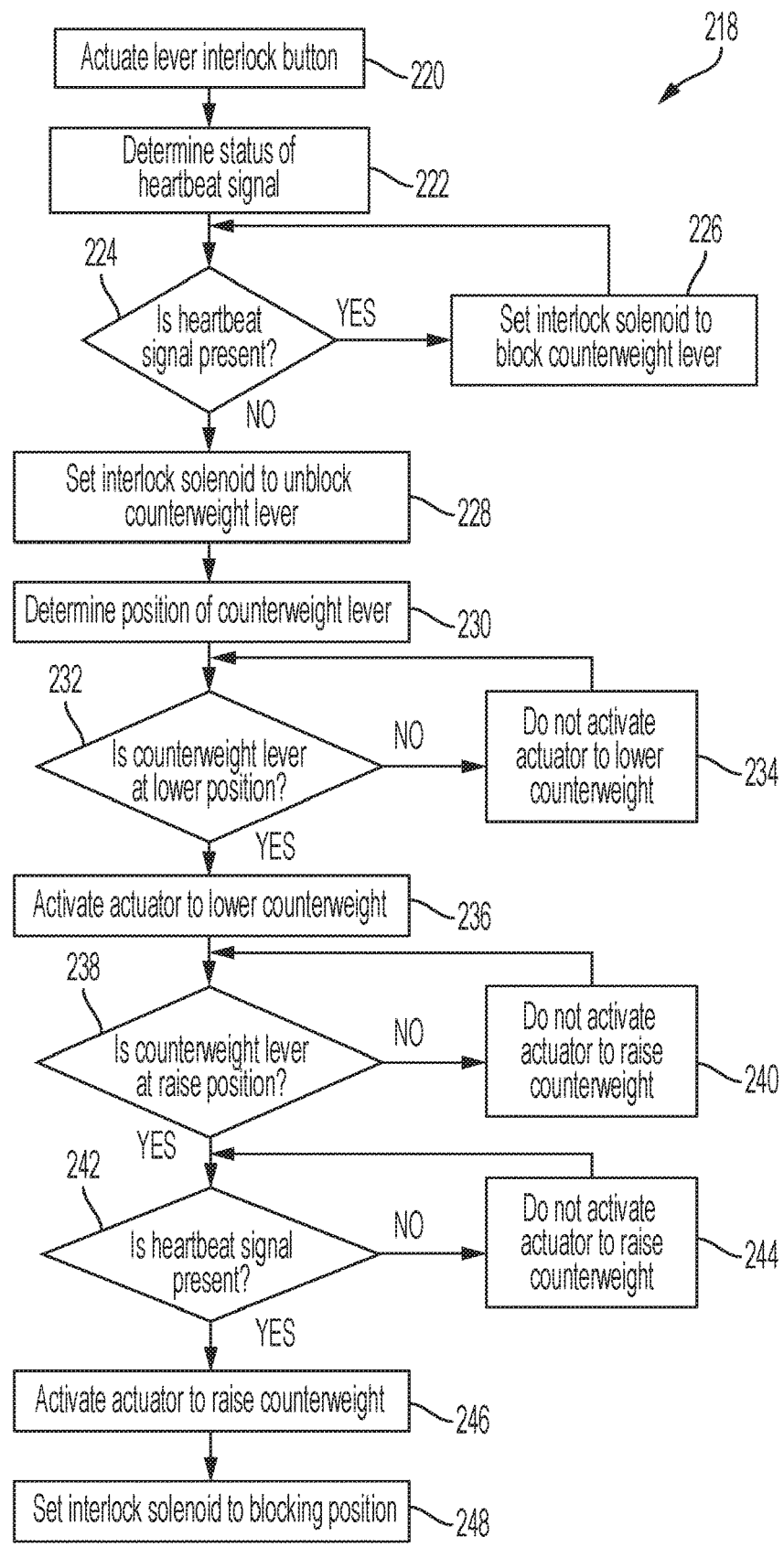
FIG. 3 is block diagram of one embodiment of a process for the present vehicle system.

The display device displays an enable/disable lever interlock status button 212 (See FIG. 2) which is selectable by the operator. In one embodiment, the status button 212 is a touch button, also known as a soft button, which is accessed by the operator at a touch screen of the user interface 136, Other types of buttons are contemplated. The controller 150, transmits an imaging sensor status signal to the user interface 136, the state of which is accessible by the operator when selecting the status button 212. The imaging sensor status signal indicates a connection status of the imaging sensor with the controller. As seen in FIG. 3, if the operator actuates the button 212 at block 220, the controller 150 determines the status of a heartbeat signal at block 222, i.e. present or not present at the controller 150 if the imaging sensor 250 transmits a heartbeat signal. If, the imaging sensor 150 does not transmit a heartbeat signal, the processor 150 interprets receipt of the imaging signal as a heartbeat signal. In one or more embodiments, the button 212 displays an indication of the of the status of the heartbeat signal, which is observable by the operator at the user interface 136, In one embodiment, the button displays the words "Imaging sensor connected" or "Imaging sensor not connected". In another embodiment, the button displays a color, where on color, such as the color red, indicates that the imaging sensor is connected and where a different color, such as the color green indicates that the imaging sensor is not connected and the weight 108 can be lowered. Other visual indicators and audio indicators are contemplated.

If it is determined that the heartbeat signal is present as indicated by the button 212, the operator exits the cab and disconnects the imaging sensor 140 from the controller 150. To insure that the disconnection has been made, at block 224, the controller 150 determines whether the heartbeat signal is present. If the heartbeat signal is present (the disconnection has not been made), the state of the interlock solenoid 210 is determined, and if not in the blocked state, is actuated at block 226 to block movement of the lever 127.

The process returns to block 224. If the heartbeat signal, however, is not present, the state of the interlock solenoid 210 is determined, and if in the block state, is actuated to unblock movement of the lever 127 at block 228. After determining the state of the interlock solenoid 210 and activating the interlock solenoid 210 if necessary, the controller 150 determines at block 230 the position of the lever 127. The controller 150 at block 232 then determines whether the counterweight lever 127 is located at the lower position. If the counterweight lever 127 is not at the lower position, the actuator 129 is not actuated at block 234. If the counterweight lever is, however, at the lower position, then at block 236 the actuator 129 is actuated to lower the counterweight 108.

The controller 150, once the counterweight 108 is lowered, waits for the counterweight to be reattached to the vehicle 100 and for the lever 127 to be moved to the raise position at block 238. If the counterweight lever 127 is not at the raise position, the actuator 129 is not activated to raise the counterweight 108 at block 240. If, however, the lever 127 is at the raise position, at block 242 the controller 150 determines whether the heartbeat signal is present at the controller 150. By determining the status of the heartbeat signal, the controller 150 restricts movement of the counterweight 108 to the raise position until the heartbeat signal is received at the controller 150. If the heartbeat signal is not present, the actuator is not actuated to raise the weight 108 at block 244. The system is configured to wait for the operator to reconnect the connector 144. If, however, the heartbeat signal is present, the actuator 129 is activated at block 246 to raise the counterweight 108. Once the counterweight 108 has been raised for reconnection to the vehicle 100, the interlock solenoid 210 is set to the blocking position at block 248. Once reset, the system waits for an input at the lever interlock button 212 which is recognized at block 220.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method to control the position of a counterweight with a lever operated actuator of a work vehicle to reduce damage to an imaging sensor system having a controller, a user interface operatively connected to the controller, and an imaging sensor operatively connected to the controller and supported by the counterweight, the method comprising:
   transmitting a signal from the imaging sensor;
   receiving the transmitted signal at the controller;
   transmitting an imaging sensor status signal from the controller to the user interface based on the received transmitted signal, the imaging sensor status signal indicating a connection status of the imaging sensor with the controller;
   providing a lever interlock button at the user interface, wherein actuation of the lever interlock button indicates to a user the connection status of the imaging sensor with the controller as one of the imaging sensor connected to the controller or the imaging sensor not connected to the controller; and
   enabling, in response to actuation of the lever interlock button, a lowering of the counterweight based on the connection status of the imaging sensor status signal.

2. The method of claim 1 further comprising disabling, in response to actuation of the lever interlock button, a lowering of the counterweight based on the connection status of the imaging sensor status signal.

3. The method of claim 2 wherein the transmitting the signal from the imaging sensor includes transmitting a heartbeat signal.

4. The method of claim 3 wherein the imaging sensor is one of a ultrasonic device, a radar device, a video camera, or a LIDAR scanner.

5. The method of claim 2 wherein the enabling a lowering of the counterweight includes enabling a lowering of the counterweight by actuating an interlock device to an unblocking state.

6. The method of claim 5 wherein the disabling a lowering of the counterweight includes disabling a lowering of the counterweight by actuating the interlock device to a blocking state.

7. The method of claim 6 wherein the disabling a lowering of the counterweight includes blocking movement of the lever with the interlock device.

8. The method of claim 7 wherein enabling a lowering of the counterweight includes not blocking movement of the lever with the interlock device.

9. A counterweight removal protection system for a work vehicle having a counterweight, a lever operated actuator to lower the counterweight from a portion of the work vehicle, and an imaging sensor supported by the counterweight and configured to transmit an imaging sensor signal, the system comprising:
  a user interface;
  an interlock device; and
  a controller operatively connected to the imaging sensor and configured to receive the imaging sensor signal, the controller including a processer and a memory, wherein the memory is configured to store program instructions and the processor is configured to execute the stored program instructions to:
    transmit an imaging sensor status signal from the controller to the user interface based on the received imaging sensor signal, the imaging sensor status signal indicating a connection status of the imaging sensor with the controller;
    provide a lever interlock button at the user interface, wherein actuation of the lever interlock button indicates to a user the connection status of the imaging sensor with the controller as one of the imaging sensor connected to the controller or the imaging sensor not connected to the controller; and
    enable, in response to actuation of the lever interlock button, a lowering of the counterweight based on the connection status of the imaging sensor status signal.

10. The system of claim 9 wherein the processor is configured to execute the stored program instructions to:
  disable, in response to actuation of the lever interlock button, a lowering of the counterweight based on the connection status of the imaging sensor status signal.

11. The system of claim 10 wherein the processor is configured to execute the stored program instructions to:
  detect the presence of a heartbeat signal as a part of the received imaging sensor signal.

12. The system of claim 11 wherein the imaging sensor is one of a ultrasonic device, a radar device, a video camera, or a LIDAR scanner.

13. The system of claim 10 wherein the processor is configured to execute the stored program instructions to:
  enable lowering of the counterweight by actuating the interlock device to an unblocking state.

14. The system of claim 13 wherein the processor is configured to execute the stored program instructions to:
  disable lowering of the counterweight by actuating the interlock device to a blocking state.

15. The system of claim 14 wherein the processor is configured to execute the stored program instructions to:
  disable lowering of the counterweight by actuating the interlock device to block movement of the lever.

16. The system of claim 15 wherein the processor is configured to execute the stored program instructions to:
  enable lowering of the counterweight by actuating the interlock device to not block movement of the lever.

17. An excavator comprising:
  a counterweight;
  an actuator;
  a lever operatively connected to the actuator to lower the counterweight from a portion of the excavator;
  an imaging sensor supported by the counterweight and configured to transmit an imaging sensor signal;
  a user interface;
  an interlock device; and
  a controller operatively connected to the imaging sensor and configured to receive the imaging sensor signal, the controller including a processer and a memory, wherein the memory is configured to store program instructions and the processor is configured to execute the stored program instructions to:
    transmit an imaging sensor status signal from the controller to the user interface based on the received imaging sensor signal, the imaging sensor status signal indicating a connection status of the imaging sensor with the controller;
    provide a lever interlock button at the user interface, wherein actuation of the lever interlock button indicates to a user the connection status of the imaging sensor with the controller as one of the imaging sensor connected to the controller or the imaging sensor not connected to the controller; and
    enable, in response to actuation of the lever interlock button, a lowering of the counterweight based on the connection status of the imaging sensor status signal.

18. The excavator of claim 17 wherein the processor is configured to execute the stored program instructions to:
  disable, in response to actuation of the lever interlock button, a lowering of the counterweight based on the connection status of the imaging sensor status signal.

19. The excavator of claim 18 wherein the processor is configured to execute the stored program instructions to:
  detect the presence of a heartbeat signal as a part of the received imaging sensor signal.

20. The excavator of claim 19 wherein the imaging sensor is one of a ultrasonic device, a radar device, a video camera, or a LIDAR scanner.

* * * * *